UNITED STATES PATENT OFFICE.

ALPHEUS FAY, OF LOUISVILLE, KENTUCKY, ASSIGNOR OF ONE-HALF TO W. N. ARTERBURN, OF LOUISVILLE, KENTUCKY.

METHOD OF TREATING CREAM OR MILK AND BUTTER.

No. 847,563.  Specification of Letters Patent.  Patented March 19, 1907.

Application filed October 27, 1906. Serial No. 340,904.

*To all whom it may concern:*

Be it known that I, ALPHEUS FAY, a citizen of the United States, residing at Louisville, in the county of Jefferson and State of Kentucky, have invented a certain new and useful Method of Treating Cream or Milk and Butter, of which the following is a specification.

In following out my method I prefer to first remove the cream from fresh milk by means of a centrifugal separator. Then the butter is removed from the cream, preferably by the use of a butter-separator, such as is disclosed in my application for butter-separator, filed August 25, 1906, Serial No. 332,047, in which the cream is maintained at a temperature of about 60° Fahrenheit and air forced through it. After the butter has been thoroughly separated from the cream the mixture should be cooled to a temperature of about 35° Fahrenheit to assist in gathering it and to render it hard for easy removal. The butter thus removed is preferably worked in the usual manner, but without salt and placed in a cool place to keep. The cream residue is also preserved in a cool place. Then when it is desired to market or use the cream the butter is again mixed with the cream residue by placing both in the separator and operating the same with the agitator at or near the top of the liquid in the separator. To obtain the best results, the butter should be remixed at a temperature of about 70° Fahrenheit and the mixture cooled at about 60° Fahrenheit while being agitated. In accomplishing this no actual heat need be applied, since should the mixture be too cool the agitation will quickly raise its temperature sufficiently to induce a thorough mixture, which should be at a temperature high enough to soften the butter, but not to melt it to an oil. If the butter is melted to an oil in this procedure, the natural flavor and sweetness will be destroyed. In this manner the butter may be again mixed with the cream residue and a cream obtained which contains the same ingredients as before, even more perfectly mixed together and smoother by reason of the fact that the agitation tends to break up the natural butter globules.

I find that the cream residue and butter keep fresh and pure longer when separated than when together, so that by this method should an oversupply of cream be on hand I am able to preserve the same for a considerably longer time than if the cream and butter were left together and then obtain the same or a better cream than before. The passage of the air through the cream and cream residue also tends to keep it fresh and to purify it. It is obvious that in case the original cream was deficient in butter an additional amount of fresh and pure butter from another source may be added, if desired, or the butter remixed may be entirely from a different source. The cream thus obtained is especially adapted for use in making ice-cream on account of its smoothness, freshness, and purity. It will also be seen that solid impurities in the cream, such as straw or hairs, will naturally become entangled in the butter when originally separated, so that in working these impurities may be removed.

The same process may be applied to the preservation of milk with equally good results and will be found to preserve the milk for a considerably longer time than when the butter and milk are attemped to be kept mixed.

The butter will naturally keep fresh longer than the milk or cream residue, and this action may be utilized to advantage by my method as follows: Suppose a large quantity of milk or cream to be on hand and there is no prospect of using the same for a longer period than the milk or cream residue will remain fresh. In this contingency the butter may be removed from the milk or cream on hand and the milk or cream residue used, the butter being preserved. Then when a use for fresh milk or cream is at hand the butter may be removed from fresh milk or cream and the first butter, being still fresh and pure, substituted for it, producing a pure milk or cream smoother and better than the fresh article. In this manner the valuable portions of an oversupply or its equivalent may be preserved indefinitely or until a use is found for it.

While I have described the preferred steps and means for carrying my invention into effect, these may be varied without departing from the spirit of the invention. I therefore do not wish to be confined to the exact steps and means set forth; but

What I claim as new, and desire to secure by Letters Patent, is—

1. The method of treating milk or cream which consists in first removing butter from the same while fresh, and then remixing butter with the residue at a temperature below the melting-point of the butter, substantially as specified.

2. The method of treating milk or cream which consists in first removing butter from the same while fresh, and then remixing the same butter with the residue at a temperature below the melting-point of the butter, substantially as specified.

3. The method of treating milk or cream which consists in first removing butter from the same while fresh and kept at a cool temperature, and then remixing butter with the residue first at a warmer temperature below the melting-point of the butter and then at a cooler temperature, substantially as specified.

4. The method of treating milk or cream which consists in first separating the butter therefrom at a medium temperature; then collecting the butter for removal at a cooler temperature; and then remixing butter with the residue, substantially as specified.

5. The method of treating milk or cream which consists in first separating the butter therefrom at a medium temperature; then collecting the butter for removal at a cooler temperature; and then remixing butter with the residue first at a warmer temperature below the melting-point of the butter, and then at a cooler temperature, substantially as specified.

6. The method of treating milk or cream which consists in first agitating the same while air is being passed through it to remove the butter, and then agitating the residue with a suitable amount of butter while air is being passed through it, to remix the two, substantially as specified.

7. The method of treating milk or cream which consists in first agitating the same at a temperature of about 60° Fahrenheit while air is being passed through it, to remove the butter, and then agitating the residue with a suitable amount of butter while air is being passed through it, said agitation being performed first at a warmer temperature below the melting-point of the butter and then at a cooler temperature, substantially as specified.

8. The method of treating milk or cream which consists in mixing pure milk elements and butter together at a temperature below the melting-point of the butter, substantially as specified.

9. The method of treating milk or cream which consists in first removing butter from the same while fresh, and then remixing the butter with pure milk elements at a temperature below the melting-point of the butter, substantially as specified.

ALPHEUS FAY.

Witnesses:
 OLIVE SPRAU,
 BRAYTON G. RICHARDS.